United States Patent

[11] 3,581,794

| [72] | Inventors | Rene Heuze<br>Ermont;<br>Jean Menin, Maurecourt; Henri Plubel,<br>Gratien, all of, France |
|---|---|---|
| [21] | Appl. No. | 781,720 |
| [22] | Filed | Dec. 6, 1968 |
| [45] | Patented | June 1, 1971 |
| [73] | Assignee | Pneumatiques, Caoutchouc Manufacture Et Plastiques Kleber-Colombes<br>Colombes, France |
| [32] | Priority | Dec. 8, 1967 |
| [33] | | France |
| [31] | | 131648 |

[54] REINFORCED TREAD TIRE
1 Claim, 1 Drawing Fig.

[52] U.S. Cl. .................................................. 152/361
[51] Int. Cl. .................................................. B60c 9/14
[50] Field of Search ........................................ 152/361

[56] References Cited
UNITED STATES PATENTS

| 3,090,417 | 5/1963 | Spelman ..................... | 152/361 |
| 3,310,094 | 3/1967 | Prevost ...................... | 152/361 |

*Primary Examiner*—James B. Marbert
*Attorney*—Holcombe, Wetherill and Brisebois

ABSTRACT: This invention relates to radial ply pneumatic tires, of the kind where the tread is reinforced by a reinforcing strap. According to this invention, the reinforcing strap throughout its width is substantially parallel to the tread surface. Moreover, it is wider than the surface of the tread when new and is at least equal to the maximum width of the tread surface after wear. The surface of the tread has a regular transverse curvature of radius equal to at least 1.3 times the height of the tire section.

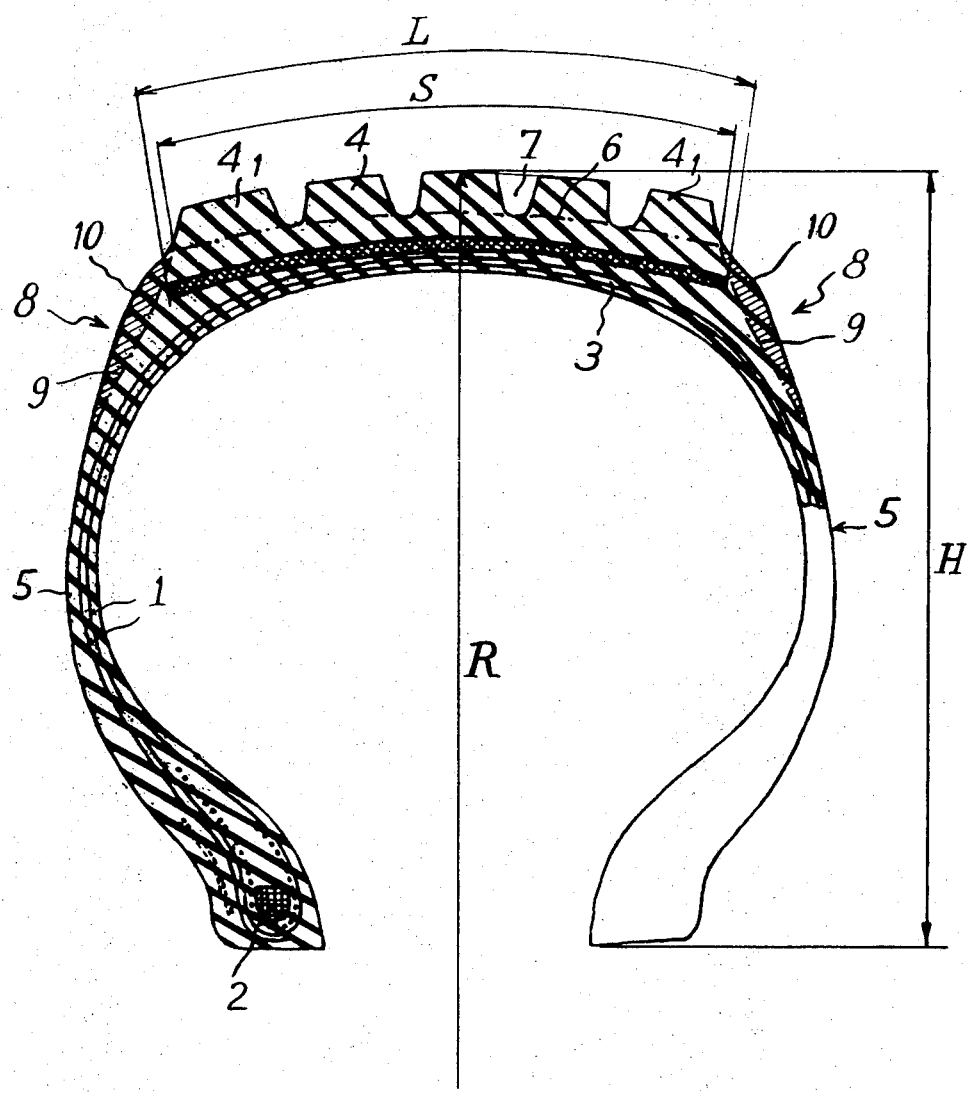

REINFORCED TREAD TIRE

The present invention relates to radial ply pneumatic tires having a tread reinforced by an inextensible breaker belt positioned across the top of the carcass. More particularly, the invention relates to tires for heavy load-carrying vehicles.

It has been shown that when using these tires, in certain cases, the sides of the tread wear out, assuming very irregular shapes which generally are accentuated with increasing mileage, to the point of rapidly putting the tires out of commission. Such a fault has been noticed more especially on tires fitted to the steering wheels of the vehicles.

It is as object of the invention to eliminate or at least to minimize this drawback without appreciably altering the other advantageous pluralities of tires of this type.

The invention consists in a radial ply pneumatic tire having an inextensible breaker belt for the tread thereof, wherein the surface of said tread has a regular transverse curvature of radius equal to at least 1.3 times the height of the section of the tire, and wherein said upper breaker belt is, over all its width, substantially parallel to the tread surface and said width being greater than the width of the surface of the tread in its new state and, said width being at least equal to the maximum width of the surface of the tread after wear thereof.

In order that the invention may be more clearly understood, reference will now be made to the accompanying drawing, which shows a cross section through one embodiment thereof, by way of example.

Referring to the drawing, there is shown a pneumatic tire comprising the usual carcass 1 attached to metal wires 2 forming the beads, an inextensible breaker belt 3, a tread 4 and wall strips 5. The tread pattern is grooved in a zigzag manner, or in any other desired form.

The carcass 1, according to the size of the tyre, is made up of one or more layers of rubberized card plies each one formed of wires or cables either of textile or metal, located in the meridian plane to produce a tire with supple sides. The breaker belt 3 is comprised for example of one or more pairs of layers or plies of cord fabric of textile or metal, the wires or cables forming these layers, which are oriented symmetrically along a slight angle with respect to the equatorial plane of the tire, this angle being generally smaller than 20° and preferably between 6° and 15° in the finished tire. The layers making up the breaker belt 3 are advantageously of equal width.

In this tire, the surface of the tread 3 has a regular transverse curvature, of large radius, that is to say, a transverse curvature or radium R at least equal to 1.3 times the height H of the tire section and, in accordance with the invention, the reinforcing breaker belt 3 of the tread 4 is, over all its width, substantially parallel to the surface of the tread 4, their respective radii of curvature having approximately the same center. It can be seen from the drawing that the curvature of the breaker belt 3 differs in that it is less pronounced that the curvature of the top of the carcass 1. Moreover, the width L of this belt 3 is greater than the width of the surface of the tread in its new state; this width is at least, equal to but preferably a little larger than the width S of the tread surface, when the tread is completely worn out, down to the level 6 of the grooves 7 of the tread. Due to this construction, the tread 4 and especially its lateral parts $4_1$ are efficiently and equally supported by the breaker belt 3 and it is thought that this could explain the improvement that tests have shown, from the point of view of the regularity of the wear on the whole of the tread.

According to a complementary characteristic of the invention the shoulders 8 of the tire, defined by the dot and dash lines 9, are reinforced by lateral bosses 10 so as to protect the edges of the breaker belt 3 by means of a rubbery mixture having a thickness sufficient to absorb the wearing stresses. These bosses 10 are situated below the level of the bottom of the grooves 7 and they link up progressively with the walls of the tire 5.

We claim:
1. A tire for use with heavy vehicles comprising a radial ply carcass and a breaker belt, the said belt including layers of material of equal size and being parallel to the tread surface, wherein the tread surface has a regular transverse curvature having a radius which is at least equal to 1.3 times the height of the cross section of the tire, and the width (L) of the belt is greater than the maximum width S of the tread surface at the point of maximum wear of the tread pattern, and the tire further comprising lateral bosses, each covering a respective edge of the belt, being located below the level of the hollows of the tread pattern and extending continuously around the tire.